US011241905B2

(12) United States Patent
Rolion et al.

(10) Patent No.: US 11,241,905 B2
(45) Date of Patent: Feb. 8, 2022

(54) MANUAL DEVICE WITH TWO RETRACTABLE HEADS COMPRISING A SINGLE MECHANISM WITH A SINGLE SPRING

(71) Applicant: SOCIETE BIC, Clichy (FR)

(72) Inventors: Franck Rolion, Asnières-sur-Oise (FR); Ludovic Fagu, Noisy-le-Sec (FR); Etienne Michenaud, Montrouge (FR)

(73) Assignee: SOCIETE BIC, Clichy (FR)

( * ) Notice: Subject to any disclaimer, the term of this patent is extended or adjusted under 35 U.S.C. 154(b) by 0 days.

(21) Appl. No.: 16/764,208

(22) PCT Filed: Nov. 13, 2018

(86) PCT No.: PCT/FR2018/052823
§ 371 (c)(1),
(2) Date: May 14, 2020

(87) PCT Pub. No.: WO2019/097153
PCT Pub. Date: May 23, 2019

(65) Prior Publication Data
US 2020/0369070 A1      Nov. 26, 2020

(30) Foreign Application Priority Data

Nov. 15, 2017   (FR) .................................. 1760742

(51) Int. Cl.
*B43K 24/14*    (2006.01)
*B43K 24/16*    (2006.01)
(Continued)

(52) U.S. Cl.
CPC .......... *B43K 24/146* (2013.01); *A45D 34/041* (2013.01); *A45D 40/20* (2013.01);
(Continued)

(58) Field of Classification Search
CPC ...... B43K 24/146; B43K 24/16; B43K 27/00; B43K 29/08; B43K 24/10; B43K 24/12;
(Continued)

(56) References Cited

U.S. PATENT DOCUMENTS 3,250,254 A      5/1966   Gerspacher
3,288,116 A  *  11/1966   Poritz ................... B43K 24/10
                                                          401/29
(Continued)

FOREIGN PATENT DOCUMENTS

CN        2108628 U      7/1992
CN        2811014 Y      8/2006
(Continued)

OTHER PUBLICATIONS

International Search Report and Written Opinion issued in International Application PCT/FR2018/052823, dated Feb. 22, 2019, with English Translation (14 pages).

*Primary Examiner* — David J Walczak
(74) *Attorney, Agent, or Firm* — Bookoff McAndrews, PLLC (57) ABSTRACT

Manual device (200), comprising a casing (212) having a first distal end (12-1) and a second distal end (12-2), a first head (16A) and a second head (16B) that are movable axially between a use position and a retracted position, and a single mechanism (214) that is configured to bring the first head (16A) and the second head (16B) from the retracted position to the use position and vice versa, the mechanism (214) comprising at least one carriage (214A1, 214A2) having at least one head selected from the first head and the second head (16A, 16B) and a single spring (214B).

20 Claims, 6 Drawing Sheets

(51) Int. Cl.
*B43K 27/00* (2006.01)
*B43K 29/08* (2006.01)
*G06F 3/0354* (2013.01)
*A45D 34/04* (2006.01)
*A45D 40/20* (2006.01)
*A45D 40/24* (2006.01)
*A45D 40/26* (2006.01)

(52) U.S. Cl.
CPC ............ *A45D 40/24* (2013.01); *A45D 40/261* (2013.01); *A45D 40/262* (2013.01); *B43K 24/16* (2013.01); *B43K 27/00* (2013.01); *B43K 29/08* (2013.01); *G06F 3/03545* (2013.01)

(58) Field of Classification Search
CPC ...... B43K 24/14; A45D 34/041; A45D 40/20; A45D 40/24; A45D 40/261; A45D 40/262; G06F 3/03545; G06F 3/033; G06F 3/03546
USPC ..................................................... 401/29–33
See application file for complete search history.

(56) References Cited

U.S. PATENT DOCUMENTS

| | | | |
|---|---|---|---|
| 5,564,849 A * | 10/1996 | Greer, Jr. ............... | B43K 5/005 40/334 |
| 6,290,413 B1 | 9/2001 | Wang | |
| 6,361,232 B1 | 3/2002 | Nagaoka et al. | |
| 7,018,124 B1 * | 3/2006 | Kageyama ............. | B43K 24/06 401/258 |
| 7,494,294 B1 * | 2/2009 | Kuo ...................... | B43K 7/005 401/29 |
| 2011/0292003 A1 | 12/2011 | Liang et al. | |
| 2015/0022503 A1 | 1/2015 | Chang et al. | |

FOREIGN PATENT DOCUMENTS

| | | |
|---|---|---|
| CN | 201725288 U | 1/2011 |
| CN | 204367645 U | 6/2015 |
| CN | 105453007 A | 3/2016 |
| WO | 2013157674 A1 | 10/2013 |

* cited by examiner

MANUAL DEVICE WITH TWO RETRACTABLE HEADS COMPRISING A SINGLE MECHANISM WITH A SINGLE SPRING

CROSS REFERENCE TO RELATED APPLICATION(S)

This application is a National Stage Application of International Application No. PCT/FR2018/052823, filed on Nov. 13, 2018, now published as WO2019/097153 and which claims priority to French Application No. FR1760742, filed on Nov. 15, 2017.

TECHNICAL FIELD

The disclosure relates to a longitudinal manual device comprising two heads which are each mounted retractably at an end of the manual device. In particular, but not exclusively, the disclosure relates to writing instruments.

PRIOR ART

Known manual devices with two retractable heads are not generally completely satisfactory from the point of view of ergonomics, size and reliability. There is therefore a need in this sense.

SUMMARY

One embodiment concerns a manual device, in particular a manual writing device, extending in an axial direction, comprising a casing having a first distal end and a second distal end opposite the first distal end in the axial direction, a first head that is movable axially between a use position in which the first head projects from the casing from the first end and a retracted position in which the first head is retracted in the casing, a second head that is movable axially between a use position in which the second head projects from the casing from the second end and a retracted position in which the second head is retracted in the casing, and a single mechanism configured to bring the first head and the second head from the retracted position to the use position and vice versa, the mechanism comprising at least one carriage having at least one head selected from the first head and the second head and a single spring.

In a general way, the axial direction corresponds to the direction of the axis of the casing, and a radial direction is a direction perpendicular to the axis of the body. It should be understood that an azimuthal or circumferential direction corresponds to the direction describing a ring round the axial direction. Moreover, unless otherwise specified, the adjectives 'interior/exterior' or 'internal'/'external' are used with reference to a radial direction such that an internal (i.e. radially internal) portion is closer to the axis of the body that an external (i.e. radially external) portion.

It should be understood that the heads are arranged opposite one another in the axial direction within the manual device. Of course, the casing may be formed as one and the same part, or as a plurality of parts. The casing forms the external portion of the manual device. For example, in the case of a writing instrument, for example a pen, the casing is formed of the outer barrel of the pen.

It should be understood that the heads may be formed by any manual device tool bit, for example a spanner or screwdriver bit, a blade, punch, a writing body, for example felt, ball or other tip provided with an ink reservoir, mechanical pencil, graphite pencil lead, chalk or any other means that allows writing on a substrate, a brush, an eraser, a friction body, an active or passive element configured to cooperate with a touch screen, for example a capacitive, resistive, inductive, infrared, optical, electrostatic screen, etc., a cosmetic applicator such as a brush, crayon, mascara brush, ball applicator, lipstick or any other means of applying cosmetics, etc.

'Single mechanism' means that one or more element(s) allowing the first head to be returned/pushed out and one or more element(s) allowing the second head to be returned/pushed out are common. In other words, the single mechanism may for example comprise two sub-mechanisms, namely one sub-mechanism for each head, these sub-mechanisms having at least one common part, for example, the single spring. According to a first variant, the single mechanism allows the first head and the second head to be returned/pushed out of the casing, independently of one another. According to a second variant, the single mechanism allows the heads to move simultaneously, and therefore one head is returned while the other is pushed out and vice versa, whilst clearly a neutral position in which both heads are retracted may be provided. Hereinafter, and unless stated otherwise, 'the mechanism' means 'the single mechanism.'

The mechanism comprises a single carriage having the two heads (for example in the case of the second variant above) or alternatively two carriages, each carriage having a different head, for example, but not necessarily, in the case of the first or the second variant above. A single spring cooperates with the carriage(s) to assist their movements when the heads pass between the use and the retracted positions. Hereinafter, and unless stated otherwise, 'the spring' means 'the single spring'. Of course, the mechanism may be of any type, for example a pawl, ratchet or spiral cam mechanism, a toothed ring forming a rotating cam, etc.

This type of manual device is therefore ergonomic owing to its single mechanism which allows the two heads to be returned/pushed out. The presence of a single spring within the single mechanism also allows the mechanism to be small in size and therefore ensures that the manual device is small in size with dimensions that are adapted to the hands of most users. Finally, a small number of springs allows the single mechanism, and therefore the manual device, to be made more reliable, in particular with regard to blockages, wear and fatigue.

In some embodiments, the manual device comprises two carriages, the spring extending axially between the two carriages and cooperating with both carriages.

It should be understood that the mechanism strictly comprises two carriages. For example, the spring is a helicoid spring, i.e. a spiral spring, for example a compression spring, extending axially between the two carriages and cooperating in abutment with each carriage.

This type of configuration allows some coupling of the axial movement of the carriages while allowing some freedom, linked to the deformability of the spring, as to the relative axial position of the two carriages. This allows the size of the mechanism to be reduced, in particular the radial size inside and outside of the spring, and therefore as a consequence the size of the manual device. For example, this allows a portion of the heads to be housed in the vicinity of the spring.

In some embodiments, the mechanism comprises a single side button.

It should be understood that the single button allows the two heads to be returned/pushed out. This type of button is particularly ergonomic for the user and helps optimize the size of the mechanism and as a consequence the size of the manual device.

In some embodiments, the button cooperates with each of the two carriages.

It should be understood that the button cooperates directly or indirectly, i.e. via an intermediate part, with the carriages. For example, an intermediate part helps facilitate assembly and optimizes the distribution of stresses.

In some embodiments, the button is configured to drive a first carriage selected from the two carriages in translation in a first axial direction whilst the spring tends to drive the first carriage in translation in a second axial direction, opposite to the first axial direction, and the button is configured to drive the second carriage among the two carriages in translation in the second axial direction whilst the spring tends to drive the second carriage in translation in the first axial direction.

In other words, the button is uncoupled, at least over a predetermined axial travel, in the second axial direction from the first carriage and uncoupled, at least over a predetermined axial travel, in the first axial direction from the second carriage. It will therefore be understood that the button allows the first carriage to be driven only in the first axial direction, and the second carriage to be driven only in the second axial direction. For example, this type of configuration allows the mechanism to be actuated to cause the heads to be returned/pushed out independently of one another. This type of configuration is particularly ergonomic for the user and helps optimize the size of the mechanism and as a consequence the size of the manual device.

In some embodiments, the mechanism comprises at least one toothed ring forming a rotating cam that cooperates with the at least one carriage.

Moreover, toothed ring mechanisms forming a rotating cam are known to persons skilled in the art. In general, when the piston is moved successively in the same direction, the teeth of this type of ring cooperate alternately with complementary teeth of a piston, and therefore the ring holds the piston alternately in two different axial positions. In examples, the carriage forms the piston, the ring allowing the carriage to be held alternately in a first position corresponding to the retracted position of the head carried by the carriage and in a second position corresponding to the use position of the head. This type of toothed ring mechanism is particularly reliable whilst the toothed ring allows the radial size of the mechanism and therefore as a consequence the size of the manual device, to be optimized. For example, this allows the head to extend axially through the ring.

In some embodiments, the mechanism is a mechanism comprising at least one spiral cam track.

Moreover, spiral cam track mechanisms are known to persons skilled in the art. Of course, the cam track may form only a portion of a spiral. A cam follows the spiral cam track, and the cam is therefore moved between a first and a second axial position. For example, the cam is formed by the carriage, which therefore passes alternately from a first position corresponding to the retracted position of the head carried by the carriage to a second position corresponding to the use position of the head. This type of spiral cam track allows the radial size of the mechanism, and therefore as a consequence the size of the manual device to be optimized. For example, the cam track extends on the internal face of the casing, which frees internal radial space where a head may extend.

In some embodiments, the first head and the second head each extend in part over a common axial portion of the manual device.

It will therefore be understood that an axial portion of the casing receives a portion of the first head and a portion of the second head. This type of configuration allows the overall size of the manual device to be optimized while leaving enough space to house each of the two heads.

In some embodiments, the first head is a writing body whilst the second head is an element configured to cooperate with a touch screen.

Hereinafter, and unless stated otherwise, 'element for a touch screen' or 'element' mean 'element configured to cooperate with a touch screen.' Of course, a touch screen element may be active, i.e. provided with an electric power supply or passive, i.e. not provided with an electric power supply. This type of element is configured to interact with, in other words to be detected by, a touch screen.

In some embodiments, the manual device comprises a button configured to cooperate with the element configured to cooperate with a touch screen only when the element is in the use position.

It should be understood that this type of button allows a physical parameter of the element to be modified. It will also be understood that the button does not follow the movement of the element when passing from the retracted position to the use position, and vice versa. When the element is in the use position, it is aligned with a complementary portion of the button, and therefore the user may actuate the button to modify a physical parameter of the touch screen element. This type of configuration allows the size of the manual device to be optimized.

BRIEF DESCRIPTION OF THE DRAWINGS

The disclosure will be better understood on reading the detailed description below of different embodiments given as non-limiting examples. This description makes reference to the pages of accompanying drawings, in which.

DETAILED DESCRIPTION OF EMBODIMENTS

Figure 1:
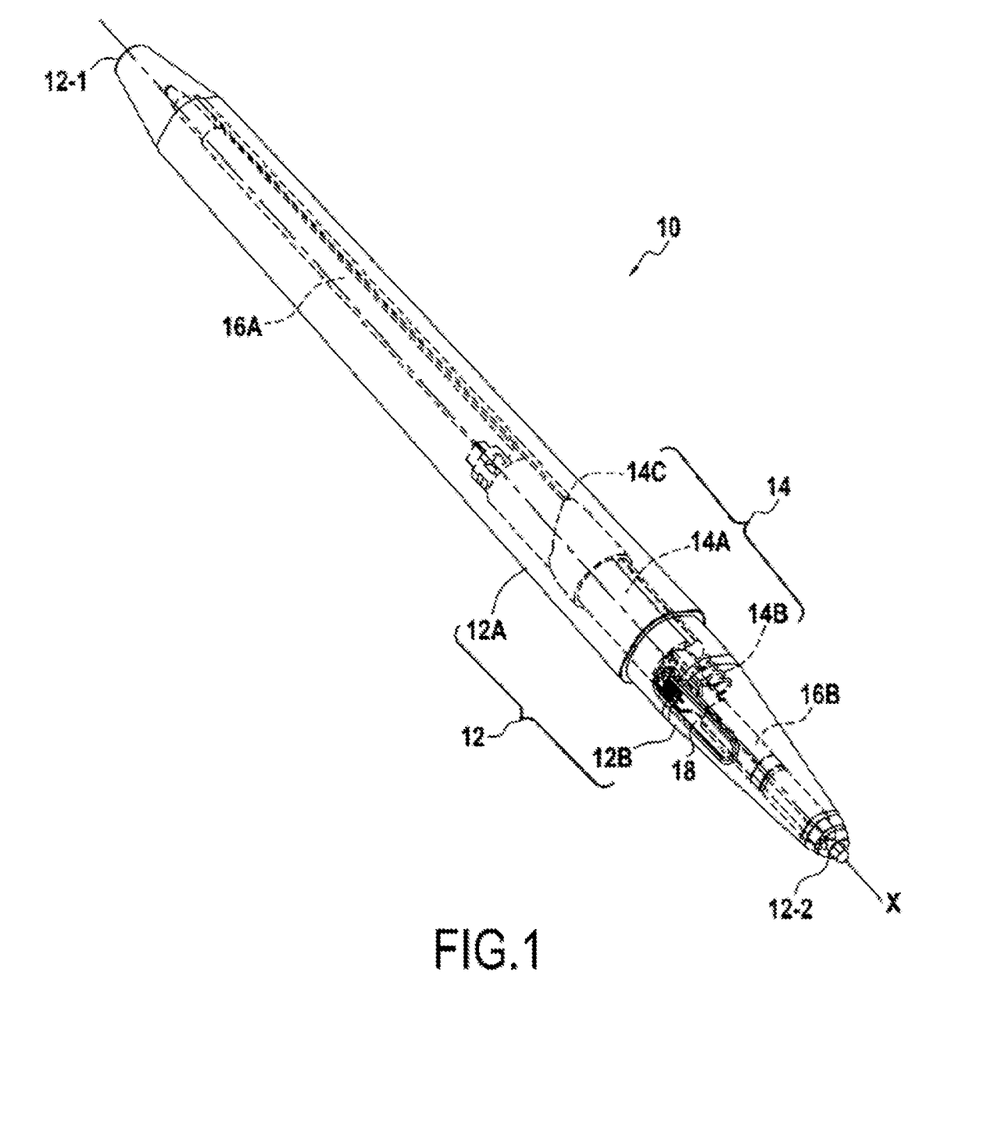
FIG. 1 shows a first embodiment of the manual device.
Figure 2:
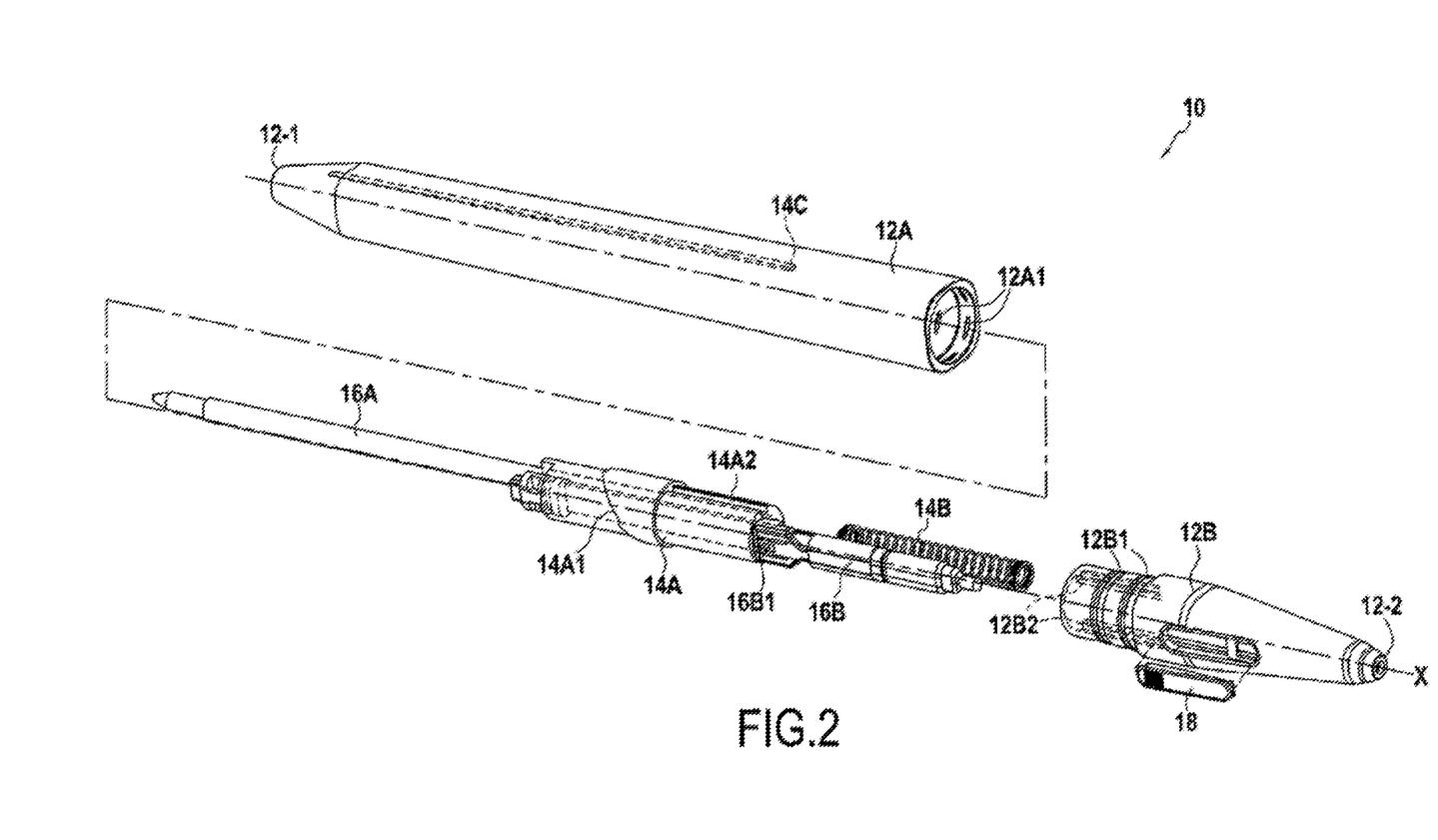
FIG. 2 is an exploded view of the first embodiment.

A manual device 10 according to a first embodiment is described with reference to FIGS. 1 and 2. The manual device 10 extends in an axial direction X and comprises a casing 12 having a first distal end 12-1 and a second distal end 12-2, opposite the first distal end 12-1 in the axial direction X.

The casing 12 has in this example a first casing portion 12A having the first distal end 12-1 and a second casing portion 12B having the second distal end 12-2. The first portion 12A and the second portion 12B are in free rotation relative to one another about the axial direction X, and are assembled together in this example by a snap fitting system comprising reliefs 12A1 and annular ribs 1261. The casing 12 receives a first head 16A, in this example a ballpoint writing body, and a second head 16B, in this example an active element configured to cooperate with a touch screen and a single mechanism 14 for returning/pushing out the heads 16A, 16B from the casing 12. In FIG. 1, the first head 16A is in the retracted position whereas the second head 16B is in the use position.

The mechanism 14 comprises a single carriage 14A and a single spring 14B. The single carriage 14A has the first head 16A and the second head 16B which are fixed, on the carriage 14A, in this example by press fitting for the first head 16A and by snap fitting for the second head 16B. The first and second heads 16A, 16B are mounted head-to-tail on the carriage 14A. The first head 16A extends over about 95% of the axial length of the carriage 14A whilst the second head 16B extends over the entire axial length of the carriage 14A. Thus, once mounted within the manual device 10, the first head 16A and the second head 16B extend over a common axial portion of the manual device 10.

The carriage 14A has, on its outer surface, a spiral cam track 14A1 which cooperates with a cam formed by the axial end 14C of an axial rib formed on the inner surface of the first casing portion 12A. The carriage 14A rotates freely about the axial direction X relative to the first casing portion 12A and cooperates axially in abutment against the cam 14C. The carriage 14A is coupled rotating about the axial direction X with the second casing portion 12B, and is free in translation in the axial direction X relative to the second casing portion 12B in this example owing to two axial ribs 12B2 of the first portion 12B each engaged in a groove 14A2 of the carriage 14A. This rib 12B2/groove 14A2 system forms a slide guiding the carriage 14A axially in translation in the axial direction X.

The single spring 14B is a spiral compression spring which extends axially between the carriage 14A and the second casing portion 12B, and which is compressed between the carriage 14A and the second casing portion 12B. Thus the spring 14B pushes the carriage 14, and more particularly the cam track 14A1, against the cam 14C. By causing the first casing portion 12A to rotate relative to the second casing portion 12B about the radial direction X, the carriage 14A is driven rotating relative to the first casing portion 12A, and therefore the cam 14C is moved along the cam track 14A1 and the axial position of the carriage 14A is modified within the manual device 10, simultaneously driving the first head 16A and the second head 16B axially between their respective use and retracted positions. Thus, in this example the cam track 14A1 forming a closed loop on itself, in making a complete rotation starting from the position shown in FIG. 1, the second head 16B is first driven from the use position to the retracted position, with the first head 16A approaching the first distal end 12-1 but remaining in the retracted position (this position corresponding to a neutral position where both heads are retracted.) Continuing this rotating movement, the first head 16A is then driven into the use position, with the second head 16B approaching the first distal end 12-1 while remaining in the retracted position. Continuing this rotating movement further, the first head 16A is taken back to the retracted position from the use position, whilst the second head 16B approaches the second distal end 12-2 but remains in the retracted position (return to the neutral position.) Finally, on finishing the rotation, the second head 16B is taken from the retracted position to the use position whilst the first head 16A approaches the second distal end 12-2 and remains retracted, as shown in FIG. 1. Of course, the second portion 12A may be rotated relative to the second portion 12B in one direction or the other to cause the first and second heads 16A, 16B to be returned/pushed out.

It should be noted that the second casing portion 12B has a radial button 18 which is aligned with a push button 16B1 for the second head 16B only when the second head 16B is in the use position. In this example, the push button 16B1 actuates the second head 16B when pressed and does not otherwise actuate the second head 16B. When the second head 16B is in the use position, the button 18 and the push button 16B1 are aligned such that when the button 18 is pressed, the push button 16B1 is pressed indirectly, and therefore the second head 16B is actuated. Of course, when the second head 16B is retracted, the button 18 and the push button 16B1 are not aligned and it is no longer possible to actuate the second head 16B. Of course, the button 18 allows a physical parameter of the second head 16B other than its simple actuation to be modified, whether the head is active or passive.

A manual device 100 according to a second embodiment is described with reference to FIGS. 3 and 4. This second embodiment of a manual device 100 is similar to the first embodiment of a manual device 10, and differs only in that it comprises two carriages instead of a single carriage, and in that the casing has a different structure. The common elements between the first and second embodiments have the same reference sign and are not described again.

Figure 3:
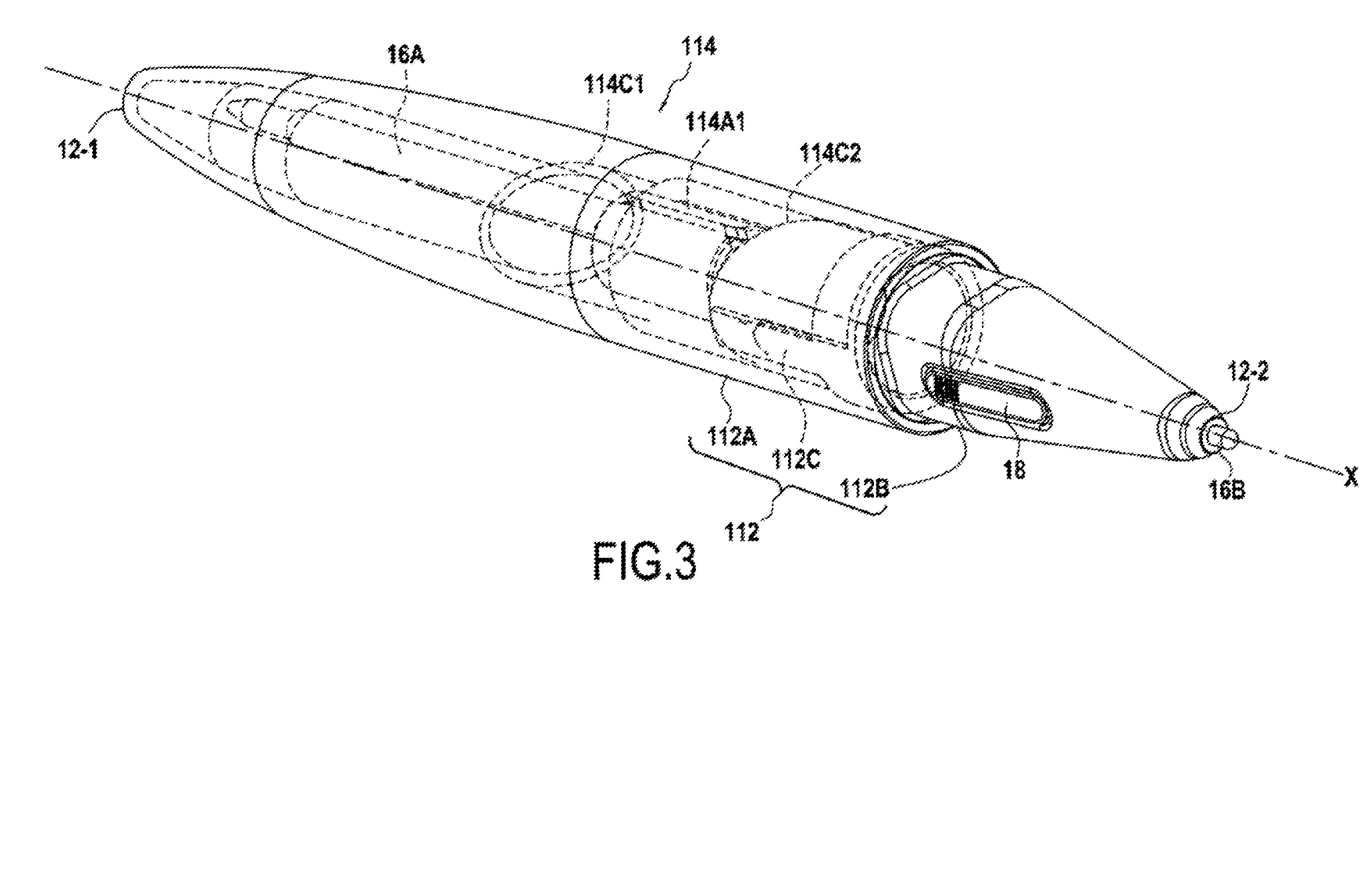
FIG. 3 shows a second embodiment of the manual device.
Figure 4:
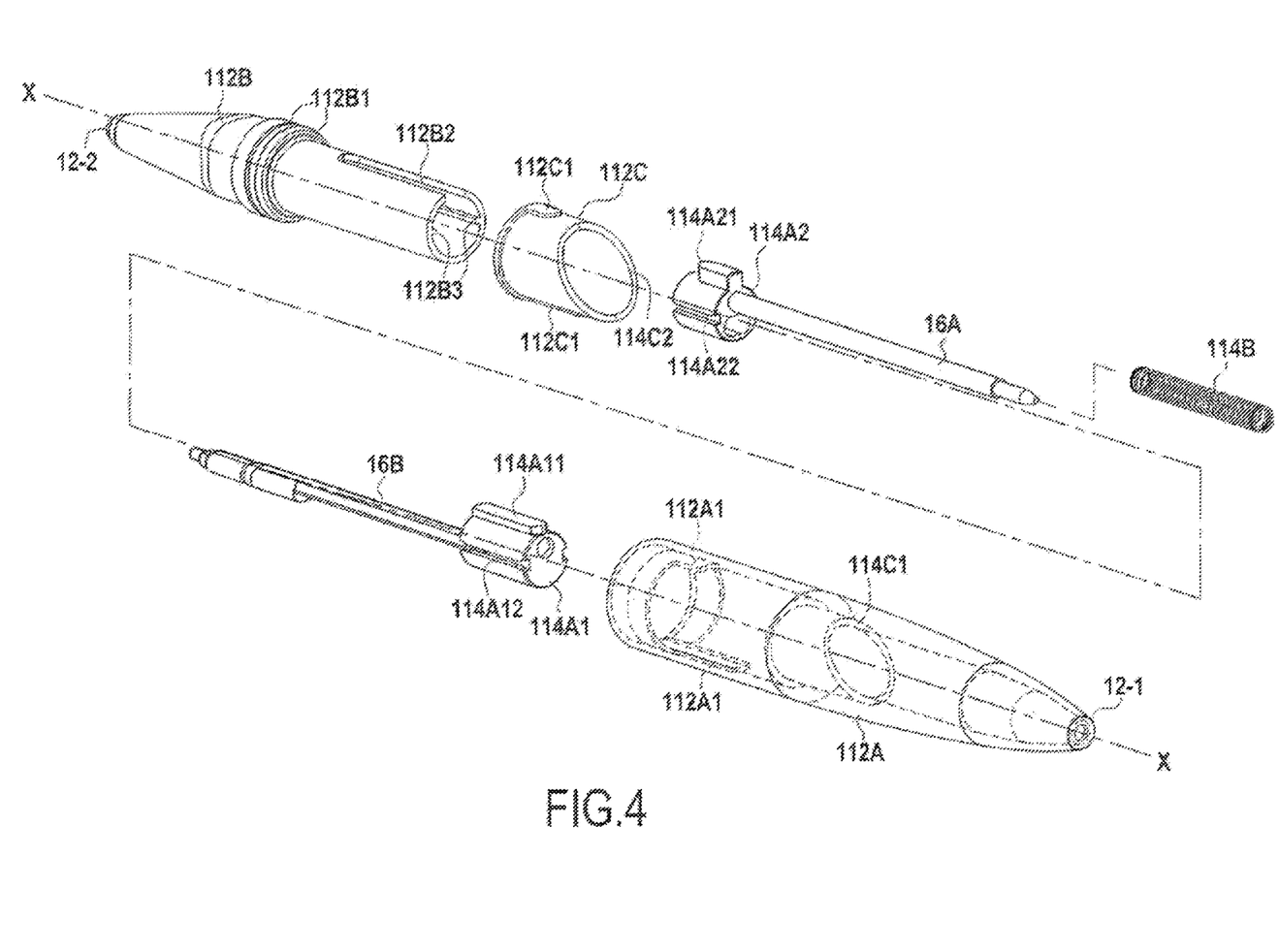
FIG. 4 is an exploded view of the second embodiment.

In FIG. 3, the first head 16A is retracted in the casing 112 whilst the second head 16B is in the use position. The casing 112 comprises, in this example, three portions, specifically a first portion 112A, a second portion 112B and a third portion 112C fitted in the first portion 112A. The single mechanism 114 comprises a first carriage 114A1, a second carriage 114A2, a single spring 114B and two spiral cam tracks 114C1 and 114C2, which are parallel.

The first head 16A and the second head 16B are mounted respectively on the second carriage 114A2 and on the first carriage 114A1, for example by snap fitting or press fitting, and each passes axially through the other carriage. The heads with their respective carriages are mounted head-to-tail. The heads therefore extend, once mounted within the manual device 100, over a common axial portion of the manual device 100.

The third casing portion 112C is coupled rotating about the axial direction X with the first portion 112A, in this example using axial ribs 112C1 of the third portion 112C engaged in axial grooves 112A1 of the first portion 112A. Moreover, in a similar way to the first embodiment, the first portion 112A (and thus the third portion 112C also) rotates freely about the axial direction X relative to the second portion 112B, by means of a relief snap fitting system (not shown) of the first portion 112A with annular ribs 112B1 of the second portion 112B.

The first portion 112A has on its inner wall the first spiral cam track 114C1 whilst the axial end of the third portion 112C facing the first cam track 114C1 forms the second spiral cam track 114C2. In this example, the first cam track 114C1 forms an axial collar facing the second distal end 12-2 whilst the second cam track 114C2 forms an axial collar facing the first distal end 12-1.

The first carriage 114A1 and the second carriage 114A2 have respectively a first cam 114A11 and 114A21 cooperating respectively with the first cam track 114C1 and the second cam track 114C2. The spring 114B is a spiral compression spring which extends axially between the first carriage 114A1 and the second carriage 114A2, and which is compressed between the first carriage 114A1 and the second carriage 114A2. Thus, the spring 114B pushes each carriage, and more particularly the cam of each carriage, against the corresponding cam track. Thus, the movement in an axial direction of a carriage, imposed by its cam track is passed on to the other carriage via the spring, and vice versa. As the two cam tracks 114C1 and 114C2 are parallel, it is thus ensured that the two carriages 114A1 and 114A2 move axially in concert. It should be noted that the first and second carriages 114A1 and 114A2 are coupled rotating with the second casing portion 112B in this example owing to the axial groove 112B2 of the second portion 112B which receives the cams 114A11 and 114A21 sliding axially, and to the axial ribs 112B3 of the second portion 112B engaged in the axial grooves 114A12 and 114A22 of the first and second carriages 114A1 and 114A2. Thus, it is ensured that the two carriages 114A1 and 114A2 follow their respective cam track, rotating about the axial direction X, in concert.

It should be noted that in this example, the spring 114B is fitted round the first head 16A. This type of mounting allows the size of the mechanism 114 and the supports of the spring 114B to be optimized, and provides great reliability in the axial alignment of the spring 114B with the first and second carriages 114A1 and 114A2.

Thus, in a similar way to the first embodiment, the cam tracks 114C1 and 114C2 each forming a closed loop, by causing the first casing portion 112A to rotate relative to the second concert portion 112B, the first head 16A is made to move successively from the retracted position to the use position and simultaneously the second head 16B from the use position to the retracted position, while passing through a neutral position where both heads are retracted.

In a similar way to the first embodiment, the second casing portion 112B has a radial button 18 which is aligned with a push button 16B1 (not shown in FIGS. 3 and 4) of the second head 16B only when the second head 16B is in the use position.

Figure 6:
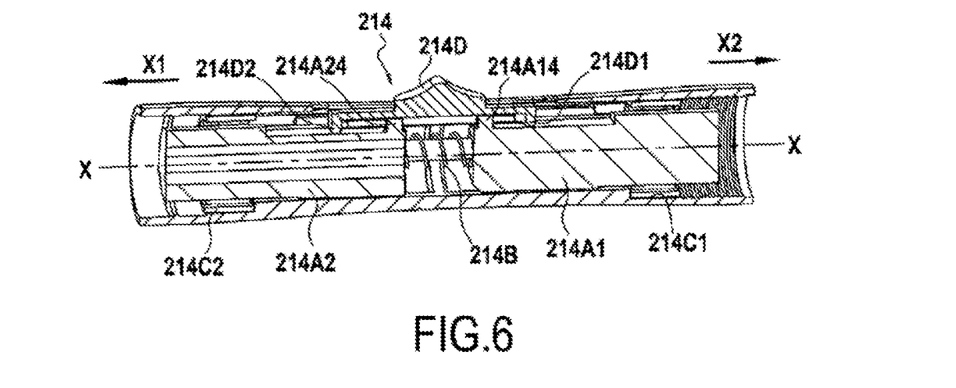
FIG. 6 is a view in part cross section of the third embodiment along the plane VI of FIG. 5
Figure 7:
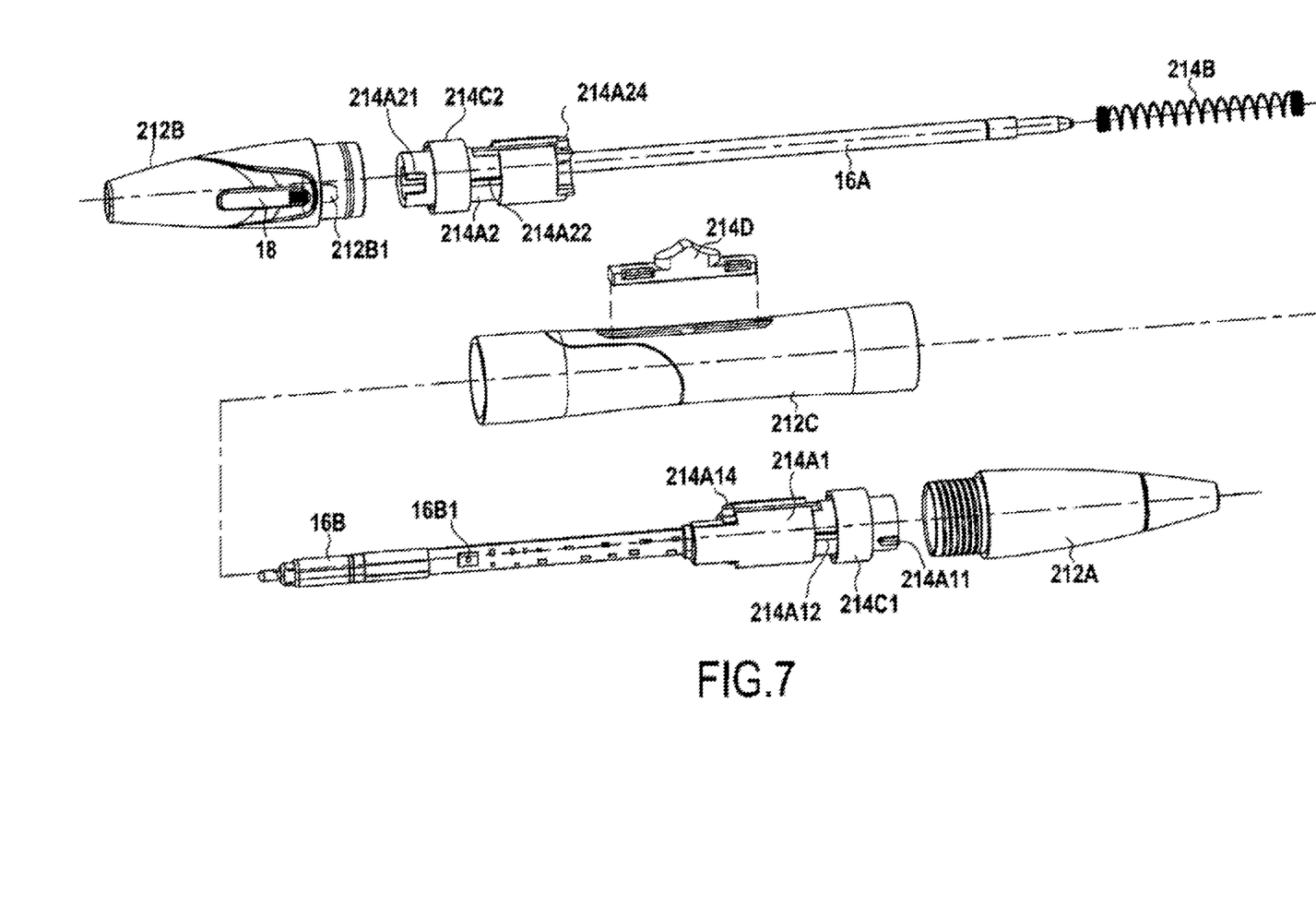
FIG. 7 is an exploded view of the third embodiment.

A manual device 200 according to a third embodiment is described with reference to FIGS. 5, 6 and 7. This third embodiment of a manual device 200 is similar to the second embodiment of a manual device 100, and differs only in that the single mechanism comprises two toothed rings forming rotating cams instead of spiral cam tracks, and in that the casing has a different structure. The common elements between the first, second and third embodiments have the same reference sign and are not described again.

Figure 5:
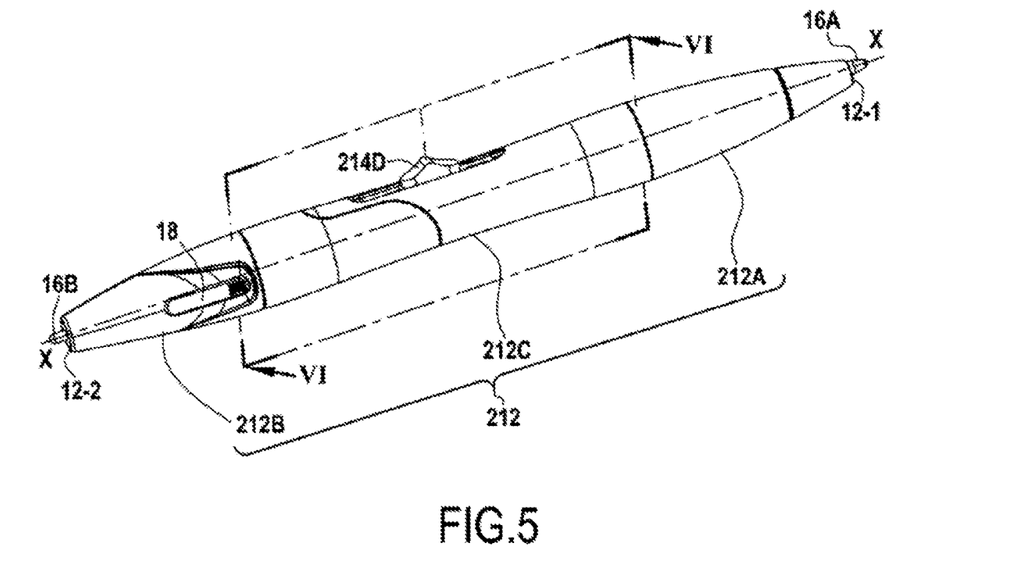
FIG. 5 shows a third embodiment of the manual device.

In FIG. 5, the first head 16A and the second head 16B are in the use position. The casing 212 comprises in this example three portions, specifically a first portion 212A, a second portion 212B and a third portion 212C arranged in the axial direction between the first portion 212A and the second portion 212B. The single mechanism 214 comprises a first carriage 214A1, a second carriage 214A2, a single spring 214B, a first and a second toothed ring forming a rotating cam 214C1 and 214C2, and a single side button 214D (i.e. arranged on a side face of the casing extending in the axial direction X.)

The first casing portion 212A is mounted by threading on a first axial side of the third casing portion 212C whilst the second portion 212B is mounted by snap fitting on a second axial side of the third casing portion 212C, opposite in the axial direction to the first axial side. A foolproof guide 212B1 for the second portion 212B cooperates with a complementary portion (not shown) of the third portion 212C, and thus ensures correct positioning of the second portion 212B relative to the third portion 212C and alignment in the circumferential direction of the radial button 18 of the second portion 212B with a push button 16B1.

The first head 16A and the second head 16B are through-mounted on the second carriage 214A2 and on the first carriage 214A1 respectively, for example by snap fitting or press fitting, and each passes axially through the other carriage. The heads with their respective carriages are mounted head-to-tail. The heads therefore extend, once mounted within the manual device 200, over a common axial portion of the manual device 200.

The first ring 214C1 is fitted round the first carriage 214A1 and is locked axially within the casing 212 by collars of the first portion 212A and of the third portion 212C. Similarly, the second ring 14C2 is fitted round the second carriage 214A2 and is locked axially within the casing 212 by collars of the second portion 212B and of the third portion 212C. The teeth (not shown) of the first ring 214C1, arranged inside the first ring 214C1, cooperate with teeth 214A11 and 214A12 of the first carriage 214A1, thus alternately locking the first carriage 214A1 in two different axial positions. Similarly, the teeth (not shown) of the second ring 214C2, arranged inside the second ring 214C2, cooperate with teeth 214A21 and 214A22 of the second carriage 214A2, thus alternately locking the second carriage 214A2 in two different axial positions.

The spring 214B is a spiral compression spring which extends axially between the first carriage 214A1 and the second carriage 214A2, and which is compressed between the first carriage 214A1 and the second carriage 214A2. Thus, the spring 214B pushes each carriage, and more particularly the teeth 214A12 and 214A22 respectively towards the first and second rings 214C1 and 214C2, and more particularly towards the teeth of the first and second rings 214C1 and 214C2. Thus, the movement in a first axial direction of a carriage is locked by the other carriage via the spring whilst the axial movement in a second axial direction, opposite to the first axial direction, of the same carriage is locked by the corresponding ring, and vice versa.

It should be noted that in this example, the spring 214B is fitted round the first head 16A. This type of mounting allows the size of the mechanism 214 and of the supports of the spring 214 to be optimized, and provides great reliability in the axial alignment of the spring 214B with the first and second carriages 214A1 and 214A2.

The first and the second carriage 214A1 and 214A2 each have a radial projection 214A14 and 214A24 cooperating with the button 214D. The button 214D has a first axial collar 214D1 configured to cooperate in abutment in a first axial direction X1 with the radial projection 214A14 and a second axial collar 214D2 configured to cooperate in abutment in a second axial direction X2, opposite to the first axial direction X1, with the radial projection 214A24. The button 214D is thus configured to drive the first carriage 214A1 in translation in the first axial direction X1 whilst the spring 214B tends to drive the first carriage 214A1 in translation in the second axial direction X2. The button 214D is also thus configured to drive the second carriage 214A2 in translation in the second axial direction X2 whilst the spring 214B tends to drive the second carriage 214A2 in translation in the first axial direction X1. It should be noted that the first and second carriages 214A1 and 214A2 are locked rotating about the axial direction X cooperating with the third portion via a ribs/grooves system (not shown).

Thus, by moving the button 214D in the first axial direction X1, the first carriage 214A1 is moved in the first axial direction X1 (with a return movement in the second axial direction X2 owing to the spring 214B), and therefore the teeth 214A11 and 214A12 cooperate with the teeth of the first ring 214C1, and the second head 16B is made to move from the retracted position to the use position or vice versa. Similarly, by moving the button 214D in the second axial direction X2, the second carriage 214A2 is moved in the first axial direction X2 (with a return movement in the first axial direction X1 owing to the spring 214B), and therefore the teeth 214A21 and 214A22 cooperate with the teeth of the second ring 214C1, and the first head 16A is made to move from the retracted position to the use position or vice versa.

In a similar way to the first and second embodiments, the radial button 18 is aligned with the push button 16B1 of the second head 16B only when the second head 16B is in the use position.

It should be noted that unlike in the first and second embodiments where the carriages, and therefore the heads, are moved axially in concert, in the third embodiment the axial movements of the carriages, and therefore of the heads, are independent, and therefore each head may take the retracted or the use position independently of one another. Thus, in the first and second embodiments when one head is in the use position, the other head is in the retracted position, whereas in the third embodiment, both heads may be simultaneously in the use position, only one of the two heads may be in the use position whilst the other head is in the retracted position, or alternatively both heads may be simultaneously in the retracted position (this last configuration also being possible with the first and second embodiments.)

Although the present disclosure has been described with reference to specific embodiments, it is clear that modifications and changes may be made to these examples without departing from the general scope as defined by the claims. In particular, individual characteristics of the different embodiments illustrated/mentioned may be combined in additional embodiments. Consequently, the description and the drawings should be considered in an illustrative rather than a restrictive sense.

The invention claimed is:

1. A manual writing device extending in an axial direction and comprising a casing having a first distal end and a second distal end opposite the first distal end in the axial direction, a first head that is movable axially between a use position in which the first head projects from the casing, from the first distal end and a retracted position in which the first head is retracted in the casing, a second head that is movable axially between a use position in which the second head projects from the casing, from the second distal end and a retracted position in which the second head is retracted in the casing, and a single mechanism configured to bring the first head and the second head from the retracted position to the use position and vice versa, the single mechanism comprising at least one carriage having at least one head selected from the first head and the second head and a single spring, the first head and the second head being mounted in a common axial portion of the manual writing device, wherein the single mechanism comprises at least one toothed ring forming a rotating cam cooperating with the at least one carriage.

2. The manual writing device according to claim 1, comprising two carriages, the single spring extending axially between the two carriages and cooperating with the two carriages.

3. The manual writing device according to claim 1, wherein the single mechanism comprises a single side button.

4. The manual writing device according to claim 3, wherein the single side button cooperates with each of the two carriages.

5. The manual writing device according to claim 4, wherein the single side button is configured to drive a first carriage among the two carriages in translation in a first axial direction whilst the single spring tends to drive the first carriage in translation in a second axial direction, opposite to the first axial direction, and the single side button is configured to drive the second carriage among the two carriages in translation in the second axial direction whilst the single side spring tends to drive the second carriage in translation in the first axial direction.

6. The manual writing device according to claim 1, wherein the first head is a writing body whilst the second head is an element configured to cooperate with a touch screen.

7. A manual writing device extending in an axial direction and comprising a casing having a first distal end and a second distal end opposite the first distal end in the axial direction, a first head that is movable axially between a use position in which the first head projects from the casing, from the first distal end and a retracted position in which the first head is retracted in the casing, a second head that is movable axially between a use position in which the second head projects from the casing, from the second distal end and a retracted position in which the second head is retracted in the casing, and a single mechanism configured to bring the first head and the second head from the retracted position to the use position and vice versa, the single mechanism comprising at least one carriage having at least one head selected from the first head and the second head and a single spring, the first head and the second head being mounted in a common axial portion of the manual writing device, wherein the single mechanism is a mechanism comprising at least one spiral cam track.

8. The manual writing device according to claim 7, wherein the at least one spiral cam track is configured to cooperate with a cam provided on the casing.

9. The manual writing device according to claim 7, wherein the first head is a writing body whilst the second head is an element configured to cooperate with a touch screen.

10. The manual writing device according to claim 7, comprising two carriages, the single spring extending axially between the two carriages and cooperating with the two carriages.

11. The manual writing device according to claim 7, wherein the single mechanism comprises a single side button.

12. The manual writing device according to claim 11, wherein the single side button cooperates with each of the two carriages.

13. The manual writing device according to claim 12, wherein the single side button is configured to drive a first carriage among the two carriages in translation in a first axial direction whilst the single spring tends to drive the first carriage in translation in a second axial direction, opposite to the first axial direction, and the single side button is configured to drive the second carriage among the two carriages in translation in the second axial direction whilst the single side spring tends to drive the second carriage in translation in the first axial direction.

14. A manual writing device extending in an axial direction and comprising a casing having a first distal end and a second distal end opposite the first distal end in the axial direction, a first head that is movable axially between a use position in which the first head projects from the casing, from the first distal end and a retracted position in which the first head is retracted in the casing, a second head that is movable axially between a use position in which the second head projects from the casing, from the second distal end and a retracted position in which the second head is retracted in the casing, and a single mechanism configured to bring the first head and the second head from the retracted position to the use position and vice versa, the single mechanism comprising at least one carriage having at least one head selected from the first head and the second head and a single spring, the first head and the second head being mounted in a common axial portion of the manual writing device, wherein the first head is a writing body whilst the second head is an element configured to cooperate with a touch screen, and the manual writing device further comprises a button configured to cooperate with the element configured to cooperate with a touch screen only when the element configured to cooperate with a touch screen is in the use position.

15. The manual writing device according to claim 14, wherein the single mechanism comprises at least one toothed ring forming a rotating cam cooperating with the at least one carriage.

16. The manual writing device according to claim 14, wherein the single mechanism comprises a spiral cam track.

17. The manual writing device according to claim 16, wherein the spiral cam track is configured to cooperate with a cam provided on the casing.

18. The manual writing device according to claim 14, comprising two carriages, the single spring extending axially between the two carriages and cooperating with the two carriages.

19. The manual writing device according to claim 14, wherein the single mechanism comprises a single side button.

20. The manual writing device according to claim 19, wherein the single side button cooperates with each of the two carriages.

* * * * *